United States Patent
Arsiè et al.

(10) Patent No.: US 11,122,811 B2
(45) Date of Patent: Sep. 21, 2021

(54) FILLED BISCUIT AND CORRESPONDING PRODUCTION PROCESS

(71) Applicant: SOREMARTEC S.A., Senningerberg (LU)

(72) Inventors: Gaetano Arsiè, Borgomale (IT); Marco Mollo, Alba (IT)

(73) Assignee: SOREMARTEC S.A., Senningerberg (LU)

( * ) Notice: Subject to any disclaimer, the term of this patent is extended or adjusted under 35 U.S.C. 154(b) by 432 days.

(21) Appl. No.: 15/906,011

(22) Filed: Feb. 27, 2018

(65) Prior Publication Data
US 2018/0249722 A1 Sep. 6, 2018

(30) Foreign Application Priority Data
Mar. 1, 2017 (LU) .................................. 100132

(51) Int. Cl.
| A21D 13/33 | (2017.01) |
| A21D 13/32 | (2017.01) |
| A21C 15/02 | (2006.01) |
| A21C 15/00 | (2006.01) |

(52) U.S. Cl.
CPC ............ *A21D 13/33* (2017.01); *A21C 15/002* (2013.01); *A21C 15/007* (2013.01); *A21C 15/02* (2013.01); *A21D 13/32* (2017.01)

(58) Field of Classification Search
None
See application file for complete search history.

(56) References Cited

U.S. PATENT DOCUMENTS

| 4,569,848 | A | 2/1986 | Giorgetti | |
| 7,582,321 | B2* | 9/2009 | Mihalos | A21C 15/02 |
| | | | | 426/275 |
| 2015/0024090 | A1* | 1/2015 | Schubert | A21C 15/02 |
| | | | | 426/89 |

FOREIGN PATENT DOCUMENTS

| DE | 197 41 717 C1 | 2/1999 |
| DE | 203 08 916 U1 | 11/2004 |
| EP | 0 057 458 A2 | 8/1982 |
| EP | 2 829 181 A1 | 1/2015 |
| EP | 2 885 974 A2 | 6/2015 |
| GB | 1 287 534 A | 8/1972 |
| JP | 01320953 H | 12/1989 |

(Continued)

OTHER PUBLICATIONS

Database GNPD [Online] Mintel; Dec. 2014 (Dec. 2014), Anonymous: "Turkey& White Cheese Filled Wholegrain Crackers", XP002771667, Database accession No. 4731017.

(Continued)

*Primary Examiner* — Jenna A Watts
(74) *Attorney, Agent, or Firm* — Rothwell, Figg, Ernst & Manbeck, P.C.

(57) ABSTRACT

Described herein is a filled biscuit characterized in that it comprises:
a biscuit body (2) shaped like a container, defining a cavity (2A) contained in which is a filling material (4);
a cover (6) made of biscuit designed to close said cavity (2A) from outside, either partially or completely; and
a second filling material (8) that is set in contact simultaneously with said cover (6), said container body (2), and said filling material (4), so as to seal said cover to said container body and withhold said first filling material within said cavity.

14 Claims, 4 Drawing Sheets

(56) References Cited

FOREIGN PATENT DOCUMENTS

WO 2009/127380 A2 10/2009

OTHER PUBLICATIONS

Database GNPD [Online] Mintel; Jan. 1998 (Jan. 1998), Anonymous: "Strawberry Creams/ Caramel Creams", XP002771668, Database accession No. 64514.
Database GNPD [Online] Mintel; Jan. 2015 (Jan. 2015), Anonymous: "Choco Sun Biscuits with Caramel Filling", XP002771669, Database accession No. 2900977.
Database GNPD [Online] Mintel; Nov. 2012 (Nov. 2012), Anonymous: "Biscuits with Milk Cream & Milk Chocolate", XP002771670, Database accession No. 1943031.
Extended European Search Report issued for European Patent Application No. 18155376.9 dated Mar. 21, 2018, 11 pages.

* cited by examiner

-- Prior Art --

FILLED BISCUIT AND CORRESPONDING PRODUCTION PROCESS

CROSS REFERENCE TO RELATED APPLICATION

This application claims priority to Luxembourgian Patent Application No. 100132 filed on Mar. 1, 2017, the disclosures of which is incorporated herein in its entirety by reference.

FIELD OF THE INVENTION

The present invention in general relates to the field of filled biscuits. In the category referred to both sweet and savoury biscuits are to be included herein.

PRIOR ART

FIG. 7 illustrates a known solution of filled biscuit, which is constituted by two disk-shaped bodies made of biscuit set between which is a layer of filling, according to an overall sandwich configuration.

This type of solution can use as filling only creams that are particularly viscous and firm, the aim being to prevent the filling from leaking out of the biscuit.

The possibility of using, instead, softer and more creamy fillings still represents a technical problem that is markedly felt.

With these fillings it becomes in fact necessary to devise solutions aimed at guaranteeing containment of the filling and ensuring, more in general, integrity of the biscuit.

The above problem is particularly felt in the field of industrial production, on account of the high rates of production and of the types of packaging envisaged, which are poorly suited to very delicate types of product.

Object and Subject of the Invention

The object of the present invention is to solve the problem mentioned above by means of a filled biscuit that presents the characteristics of claim 1.

The present invention moreover regards a process for producing a filled biscuit according to claim 7 and a plant for the production of filled biscuits according to claim 12.

The claims form an integral part of the technical teaching provided herein in relation to the invention.

BRIEF DESCRIPTION OF THE DRAWINGS AND DETAILED DESCRIPTION OF ONE OR MORE EMBODIMENTS OF THE INVENTION

Further characteristics and advantages of the invention will emerge clearly from the ensuing description with reference to the annexed drawings, which are provided purely by way of non-limiting example and in which.

In the ensuing description, various specific details are illustrated aimed at enabling an in-depth understanding of the embodiments. The embodiments may be provided without one or more of the specific details, or with other methods, components, or materials, etc. In other cases, known structures, materials, or operations are not shown or described in detail so that various aspects of the embodiment will not be obscured.

The references used herein are only provided for convenience and hence do not define the sphere of protection or the scope of the embodiments.

Figure 1:
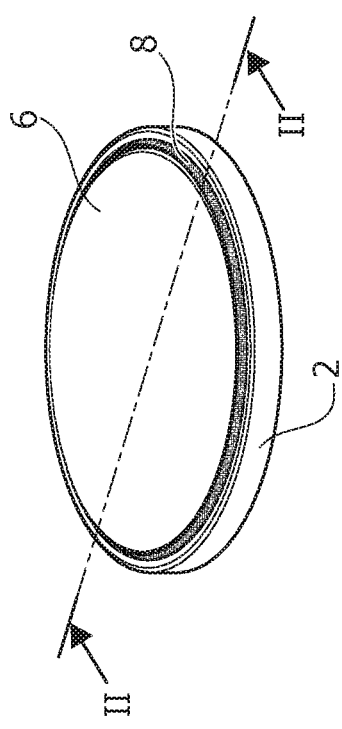
FIG. 1 illustrates, according to an axonometric view, an example of filled biscuit of the type described herein.

In general, the filled biscuit described herein comprises (see FIGS. 1 and 2) a container body 2, which defines a cavity 2A, contained in which is a filling 4, and a cover 6, which closes at least partially the cavity 2A with the filling 4 inside it. The body 2 and the cover 6 are both made of biscuit.

The biscuit described herein further comprises a second filling material 8, which is set in contact simultaneously with the body 2, the cover 6, and the layer of filling 4 so as to seal the cover 6 to the body 2, and at the same time withhold the filling 4 inside the cavity 2A of the body 2.

The material 8 hence performs the dual function of barrier against exit of the filling, on the one hand, and, on the other, of adhesive between the body 2 and the cover 6, thus ensuring a firm connection thereof.

In view of the characteristics mentioned above, in the biscuit described herein it is possible to use as filling even soft and creamy substances, without there being the drawbacks mentioned at the start, since the filling is practically sealed within the cavity 2A. In fact, in preferred embodiments, filling 4 is creamy in texture.

The composition of the material 8 may vary according to the requirements of application. For example, according to the recipe and the organoleptic properties envisaged for the biscuit, the material may be constituted by a fatty base or else by a sugary base.

Generally, the filling material 8 has a melting point higher than that of the main filling 4. Once again in general, the melting point of the material 8 will moreover be higher than the temperature envisaged for preservation and consumption of the biscuit, for example higher than 20° C. or 22° C. for biscuits to be consumed at room temperature, precisely to be able to perform the functions referred to above.

By way of example, it should now be noted that the present applicant has identified a preferred composition of the filling material 8, obtained from the following recipe:

- 40-60 wt % of fatty phase, in particular refined stearin with a melting point of 45° C., preferably a percentage of between 45-55 wt %;
- 5-9 wt % of cocoa powder;
- 40-44 wt % of lactose; and
- soy lecithin for the remaining part.

The above composition has proven suitable for performing the functions indicated above of sealant and adhesive, specifically in applications for biscuits to be consumed at room temperature (its melting point is around 50° C.-60° C.), and moreover its organoleptic properties have proven compatible and appreciable in combination with a filling constituted by the spreadable cream Nutella® produced by a company of the same Group the present applicant belongs to.

As regards the body 2 and the cover 6, they may be obtained from any dough for the production of biscuits.

Generally, a dough for biscuits comprises water (5-25 wt %), flour (30-80 wt %), leavening agents (0.1-6 wt %), sugar and/or other sweetening substances (5-35 wt %), for example glucose syrup, and finally butter or else vegetable fat (5-40 wt %). To these typical basic ingredients there may then be added further components, such as cacao, hazelnuts, etc.

The dough may be either a dough for dry biscuits or a dough for biscuits of the shortbread type.

The two types mentioned can thus be distinguished as follows: for 100 kg of flour,
the dough for dry biscuits comprises from 5 to 12 kg of fats and from 14 to 40 kg of water; and
the dough for biscuits of the shortbread type comprises from 15 to 25 kg of fats and from 14 to 18 kg of water.

In preferred embodiments, body 2 and cover 6 are crunchy in texture.

On the other hand, as mentioned at the start, the filled biscuit described herein may also constitute a savoury product, and hence in this case the parts made of biscuit and the two filling materials will comprise in the their recipe a savoury component that completely or partially replaces a sweet component.

To return to the body 2 and to the cover 6, these may have various shapes and dimensions, so that, through the solution described herein, it is in effect possible to offer the consumer a wide range of products. The container body 2 may in particular envisage any generally hollow conformation, whether this be defined by cylindrical walls and flat bottom, as in the example of FIGS. 1 and 2, or also, for example, by a single hemispherical wall or a wall of a similar but irregular type. The profiles in plan view of the bodies 2 and 6 may clearly be of any desired shape.

In various preferred embodiments, as in the one illustrated, the body 2 has a mouth edge 22 that defines a top opening larger than the overall dimensions in plan view of the cover 6, so that the latter will rest completely on the layer of filling 4, and between the latter and the edge 22 a gap 28 is created of a substantially annular shape. In this case, the material 8 is applied along the gap 28 surrounding the cover 6.

Figure 2:
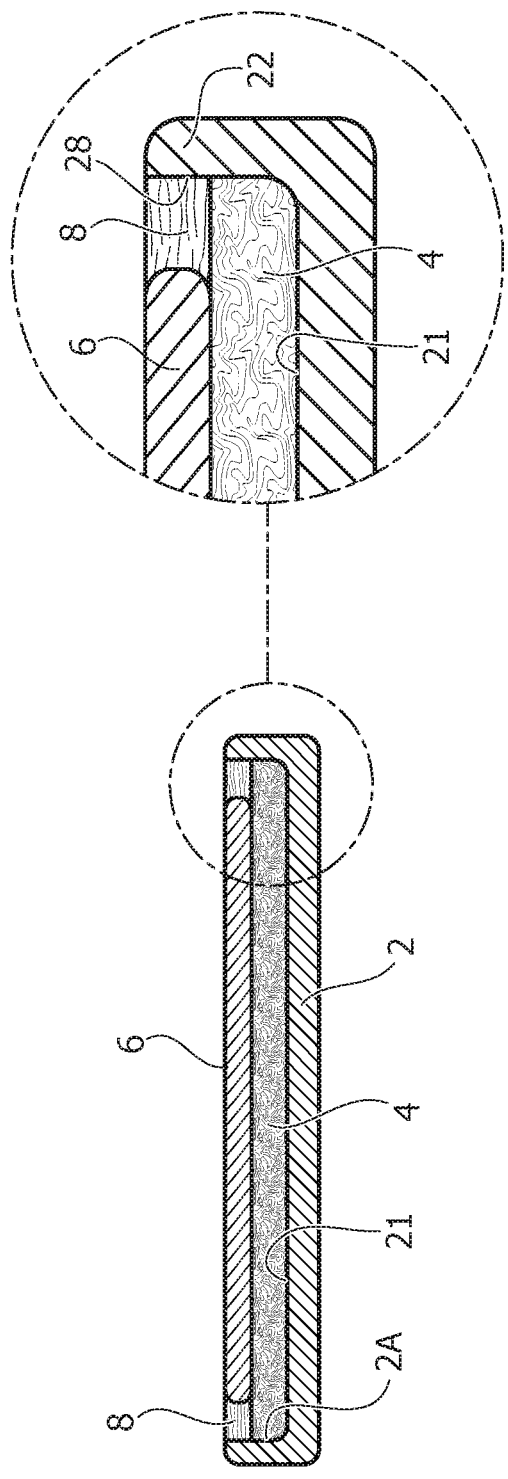
FIG. 2 is a cross-sectional view of the biscuit of FIG. 1, according to the plane of section II-II.

With reference to the detail of FIG. 2, it may be seen that the material 8 is in contact, laterally, with the cover 6 and the edge 22 of the body 2, and, at the bottom, with the layer of filling 4. It acts, on the one hand, as adhesive that holds together the cover 6 and the body 2, and, on the other, constitutes a barrier designed to prevent exit of the layer of filling 4 from the cavity 2A.

Figure 4:
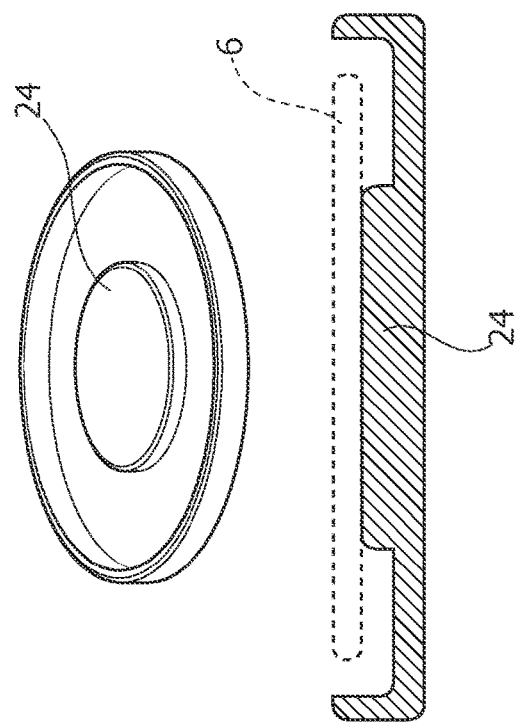
FIG. 4 illustrates a part of biscuit according to a further embodiment of the biscuit described herein.

In further preferred embodiments (see in this connection FIG. 4), the body 2 moreover has, in a substantially central internal area thereof, a relief 24 that rises from the bottom of the body 2 for a height that allows it to set itself in contact with the cover 6 and support it. In various preferred embodiments, as in the one illustrated, the height of the relief 24 is such that the cover 6 that rests thereon is substantially flush with the edge 22 of the body 2.

The relief 24 clearly constitutes a support for the cover 6 and its function becomes particularly significant at the moment when the consumer bites into the biscuit.

In fact, when the consumer bites into the biscuit, usually in its central area, the cover, in addition to being cut by the action of the teeth also undergoes bending stress and, as a result of its brittleness, tends to break into a number of parts, which then sink into the filling, above all when this is creamy as in the applications to which main reference is made herein.

This evidently entails a complete breaking up of the biscuit and hence the risk for the consumer of getting dirty already at the first bite.

Instead, the relief 24, which is substantially in the point where the consumer bites the biscuit, supports the cover during the bite, preventing the cover from breaking up into a number of parts and sinking into the filling.

Figure 3:
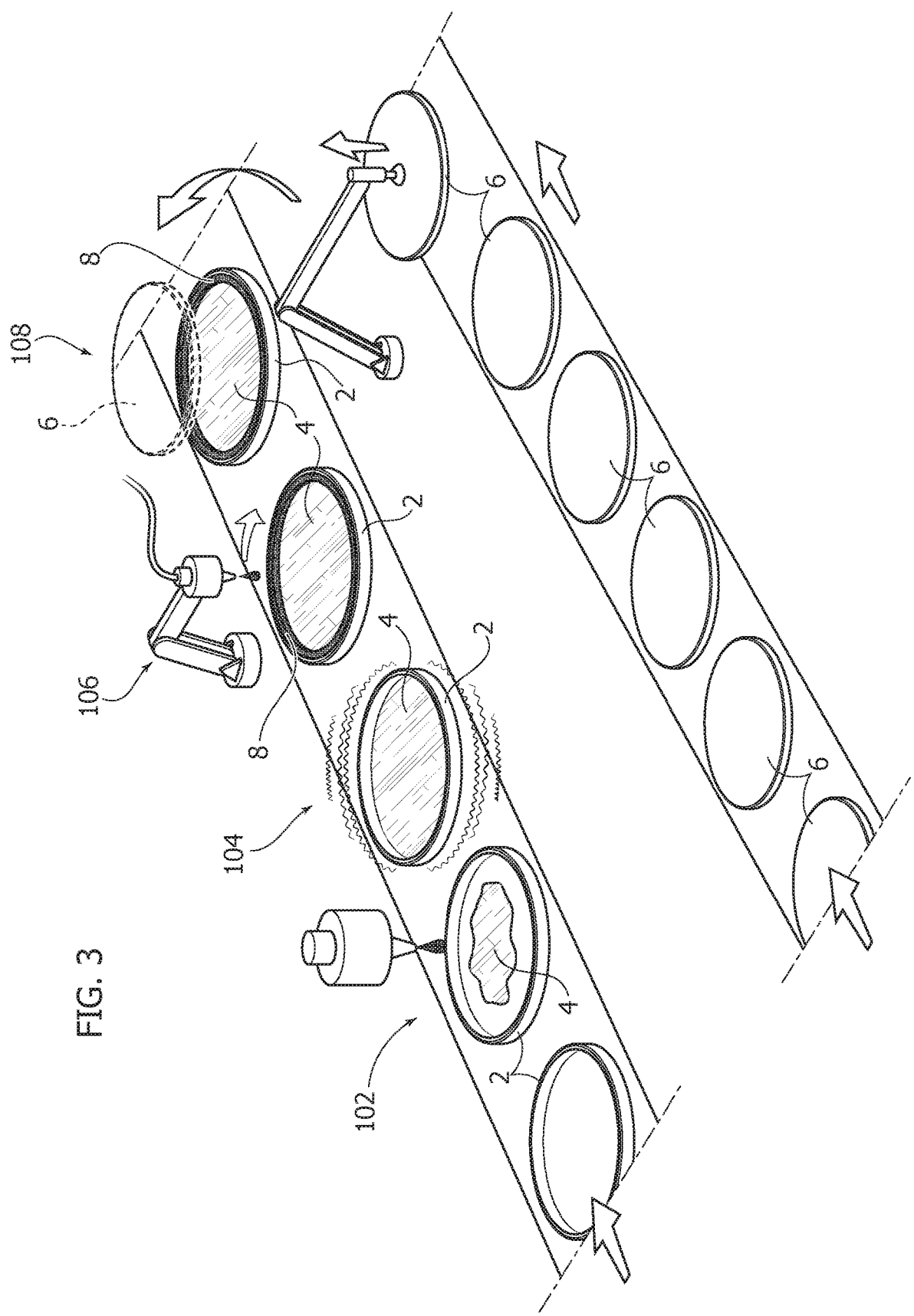
FIG. 3 is a schematic illustration of an embodiment of the process described herein.
Figure 7:
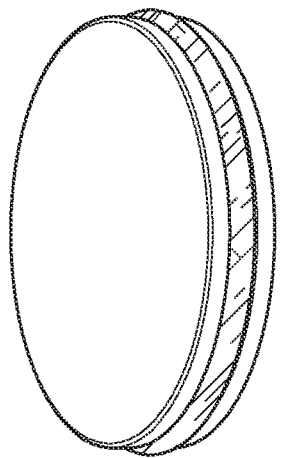
FIG. 7 illustrates an example of filled biscuit according to the prior art.

FIG. 3 illustrates a preferred process for the production of the filled biscuit described herein. The example illustrated starts from a condition where the body 2 and the cover 6 have already been produced, this for simplicity of description since the two parts made of biscuit can be produced according to any conventional process.

The process described herein envisages, in a station 102, a first step for dispensing the filling 4 on the body 2, the latter coming, for example, directly from the baking station of the line that has produced it. This step may be carried out by a conventional dispensing head that supplies in a substantially central position of the body 2 a preset amount of filling.

The body 2, together with the filling dispensed thereon, then goes on to a station 104 that is designed to spread the filling over all the cavity 2A of the body 2. For this purpose, the station 104 may be provided with vibrating means that impart on the body 2 a vibrational movement, for example in a vertical direction, a horizontal direction, or an orbital direction, or else combinations of these movements, such as to induce the filling, by the dynamic effect, to distribute substantially evenly over the entire cavity 2A.

At this point, the body 2 is sent on to a second dispensing station 106, which has the task of applying the second filling material 8.

As schematically represented in the figure, this station is preferably provided with a dispensing head that is able to dispense the material 8 along a preset path, in the plane of the layer of filling 4. This station may, for example, be provided with a spot-dispensing system, for applications in the foodstuff sector, of any type commercially available today.

Finally, the body 2 is sent on to a station 108, provided for example with a device of a pick-and-place type, in which the cover 6 coming from another line, is positioned on the body 2 in contact with the layer of filling 4 and with the filling material 8, as in the configuration illustrated in FIG. 2.

Possibly, the process envisages cooling the biscuit formed so as to cause fast hardening of the material 8, in view of subsequent handling of the biscuit for packaging.

Clearly, the representation provided of the process of FIG. 3 is altogether schematic, and the real process will envisage conveying lines designed to feed to the various stations more or less large lots of bodies 2 and covers 6.

In this connection, it should be noted that usually industrial lines for production of biscuits envisage simple conveyor belts on which the biscuits are rested, as represented schematically in FIG. 3.

Instead, the process described herein envisages, according to various preferred embodiments, that at least during the steps described above, the bodies 2 will be housed, individually, within respective cells provided in moulds that are moved along the line of the plant. This prearrangement is typical of lines for production of chocolate products, whereas it is altogether new in the sector of production of biscuits. Alternatively, it is in any case also possible to envisage conveyance of the biscuits, free on a belt.

Figure 5:
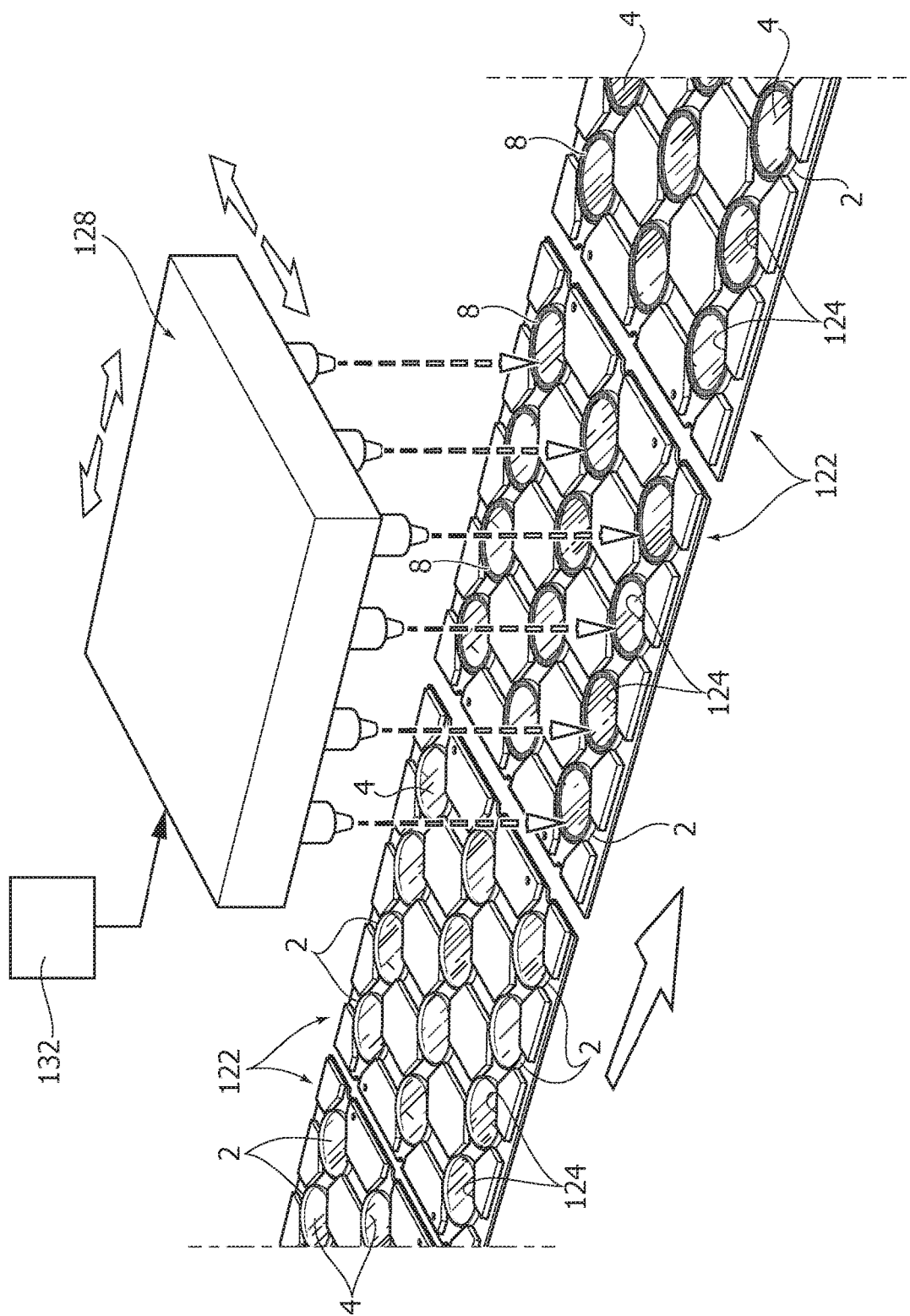
FIG. 5 is a schematic illustration of a step of the process described herein.

By way of example, FIG. 5 illustrates a series of moulds 122 that carry the bodies 2 containing the filling 4 and that are moving through a dispensing station corresponding to the station 104 of FIG. 2. The moulds 122 are moved via known means (not illustrated), for example via a chain movement system.

For obvious requirements of production, the dispensing head 128 is inevitably provided with a multiplicity of nozzles in order to carry out simultaneous dispensing on a number of bodies 2. The head 128 is controlled by a control unit 132 that moves it along a path corresponding to the one according to which the material 8 is to be applied on the body 2.

The cells 124 of the moulds perform the function of providing a reference for positioning of the bodies 2 on the biscuit-production line, and to keep them in the right position throughout the steps of the process, also during the treatment that the bodies 2 undergo in the station 102.

Figure 6:
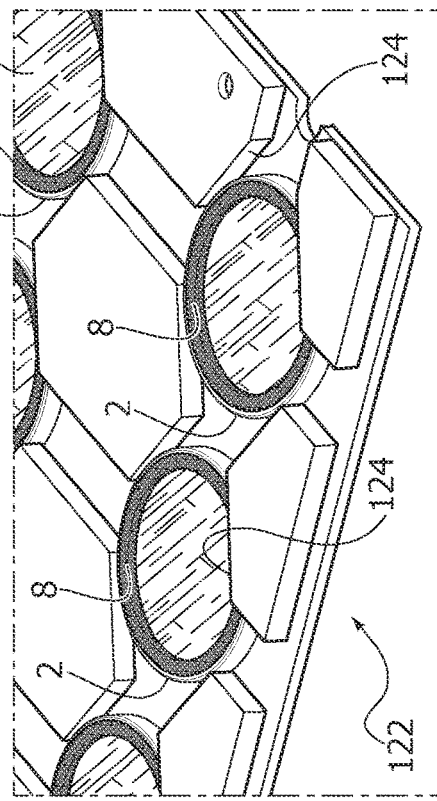
FIG. 6 illustrates a detail of means used in the process described herein.

In various preferred embodiments (as in the one illustrated (see FIGS. 5 and 6), the cells 124 are delimited by walls that are defined along the sides of a circumscribed theoretical polygon, a rhombus in the embodiment illustrated. As compared, for example, to a circular profile corresponding to the profile of the bodies 2, this configuration affords the advantage of making it possible to manage the variations in size between the individual bodies 2, due to the production tolerances, and at the same time to guarantee, in general, a more precise and centred positioning of the bodies 2 within the cells.

In the context of the process described herein, the precise and preset positioning of the bodies 2 constitutes an important characteristic in order to be able to provide high production volumes and, at the same time, guarantee a high quality. For instance, with reference to the step of dispensing of the material 8 of FIG. 5, it is clear that any possible misalignment of the individual bodies 2 may entail that the ring of material is deposited partially outside one or more biscuits, this jeopardizing both the functions for which the material is designed and the aesthetic appearance of the product.

In the light of the foregoing, the cells 124 instead enable limitation of this misalignment, hence reducing production waste.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A filled biscuit characterized in that it comprises:
   a biscuit body shaped like a container and having a bottom and side walls, defining a cavity contained in which is a filling material;
   a cover made of biscuit designed to partially close said cavity from outside; and
   a second filling material, which is set in contact simultaneously with said cover, said container body, and said filling material, so as to seal said cover to said container body and withhold said first filling material within said cavity,
   wherein a mouth edge of said container body defines an opening that has a size larger than a corresponding size of said cover, thus creating between said cover and said container body a section along which said second filling material is set.

2. The biscuit according to claim 1, wherein said second filling material is provided along the mouth edge of said container body so as to close any passage of said first filling material between said cover and said container body.

3. A filled biscuit characterized in that it comprises:
   a biscuit body shaped like a container and having a bottom and side walls, defining a cavity contained in which is a filling material;
   a cover made of biscuit designed to partially close said cavity from outside; and
   a second filling material, which is set in contact simultaneously with said cover, said container body, and said filling material, so as to seal said cover to said container body and withhold said first filling material within said cavity, wherein a mouth edge of said container body defines an opening larger than the overall dimensions in plan view of said cover, thus creating between said cover and said container body an annular gap along which said second filling material is set.

4. The biscuit according to claim 1, wherein said second filling material has a higher melting point than said first filling material.

5. The biscuit according to claim 1, wherein said body has a relief that rises from the bottom of said body for a height that allows it to set itself in contact with said cover and support it.

6. The biscuit according to claim 5, wherein said relief is positioned in an internal, substantially central, area of said body.

7. A filled biscuit comprising:
   a biscuit body shaped like a container and having a bottom and side walls, defining a cavity contained in which is a filling material;
   a cover made of biscuit designed to close said cavity from outside,
   wherein said cover closes said cavity from outside partially, wherein a mouth edge of said container body defines an opening larger than overall dimensions in plan view of said cover, thus creating between said cover and said container body an annular gap; and
   a second filling material, which is constituted by a fatty base or a sugary base and has a melting point higher than a melting point of said first filling material and higher than 20° C. or 22° C., said second filling material being set along said annular gap and in contact simultaneously with said cover, said container body, and said first filling material, so as to seal said cover to said container body and withhold said first filling material within said cavity.

8. The biscuit according to claim 1, wherein the bottom of the biscuit body is flat and the side walls of the biscuit body are cylindrical.

9. The biscuit according to claim 7, wherein the bottom of the biscuit body is flat and the side walls of the biscuit body are cylindrical.

10. The biscuit according to claim 3, wherein said second filling material is provided along the mouth edge of said container body so as to close any passage of said first filling material between said cover and said container body.

11. The biscuit according to claim 3, wherein said second filling material has a higher melting point than said first filling material.

12. The biscuit according to claim 3, wherein said body has a relief that rises from the bottom of said body for a height that allows it to set itself in contact with said cover and support it.

13. The biscuit according to claim 12, wherein said relief is positioned in an internal, substantially central, area of said body.

14. The biscuit according to claim 3, wherein the bottom of the biscuit body is flat and the side walls of the biscuit body are cylindrical.

* * * * *